United States Patent [19]

Korppoo et al.

[11] Patent Number: 4,718,513
[45] Date of Patent: Jan. 12, 1988

[54] WHEEL DRIVEN AIR CUSHION VEHICLE

[75] Inventors: Seppo Korppoo, Espoo; Martin Landtman, Helsinki, both of Finland

[73] Assignee: Oy Wärtsilä Ab, Helsinki, Finland

[21] Appl. No.: 828,858

[22] Filed: Feb. 12, 1986

Related U.S. Application Data

[63] Continuation-in-part of Ser. No. 539,752, Oct. 6, 1983, abandoned.

[30] Foreign Application Priority Data

Oct. 19, 1982 [FI] Finland ............................ 823577

[51] Int. Cl.[4] .............................................. B60V 3/02
[52] U.S. Cl. .................................... 180/119; 180/120; 180/307
[58] Field of Search .............. 180/119, 117, 118, 116, 180/170, 178, 307, 120; 244/50

[56] References Cited

U.S. PATENT DOCUMENTS

| | | | |
|---|---|---|---|
| 3,078,939 | 2/1963 | Bollum | 180/120 |
| 3,398,809 | 8/1968 | Wood | 180/119 |
| 3,601,215 | 8/1971 | Nissen | 180/119 |
| 3,889,775 | 6/1975 | Luscher | 180/118 |
| 3,968,851 | 7/1976 | Windt | 180/117 |
| 4,063,611 | 12/1977 | Anderson | 180/119 |

FOREIGN PATENT DOCUMENTS

| | | | |
|---|---|---|---|
| 1914678 | 3/1969 | Fed. Rep. of Germany | 180/119 |
| 126247 | 7/1983 | Japan | 180/120 |

*Primary Examiner*—David M. Mitchell
*Assistant Examiner*—Everett G. Diederiks, Jr.
*Attorney, Agent, or Firm*—Dellett, Smith-Hill and Bedell

[57] ABSTRACT

An air cushion vehicle comprises a main engine connected to drive, firstly, a fan device for generating an air cushion for the support of the vehicle, and secondly, a traction wheel device for propulsion of the vehicle. Operating power is simultaneously transmitted from the main engine to the fan device and to a hydraulic drive system connected to drive the traction wheel device. The ratio of power distribution from the main engine to the fan device and to the traction wheel device is arranged to be regulated by altering the power consumption characteristics of either or both of the fan device and the traction wheel device.

8 Claims, 1 Drawing Figure

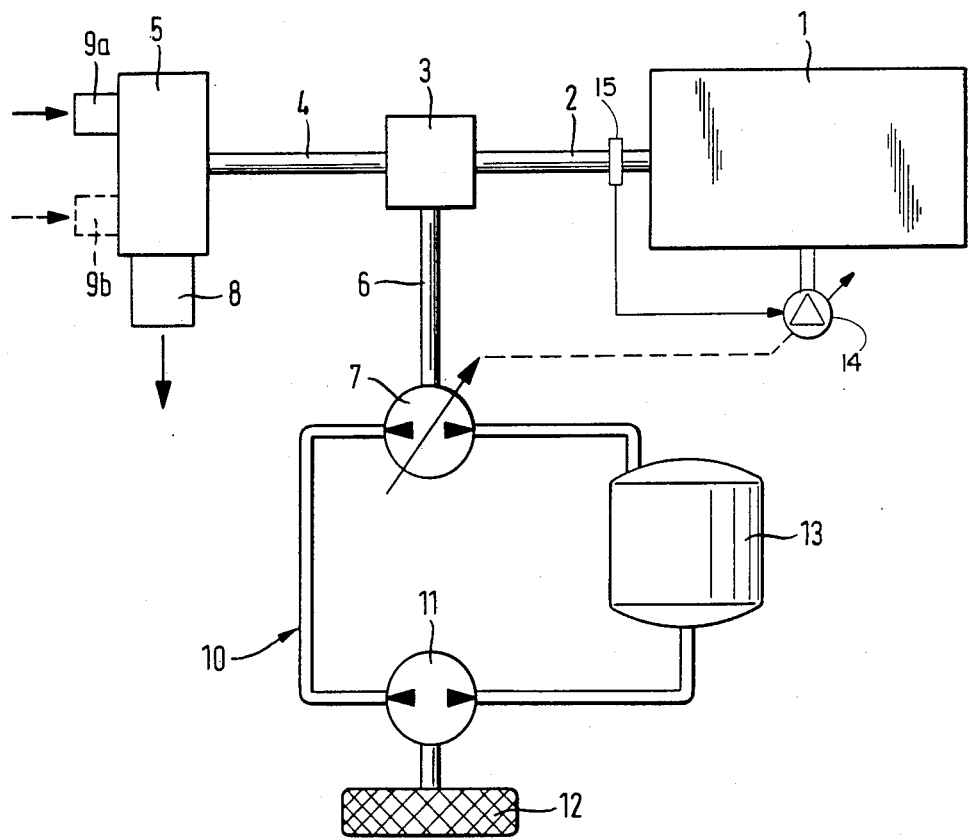

WHEEL DRIVEN AIR CUSHION VEHICLE

CROSS-REFERENCE TO RELATED APPLICATION

This is a continuation-in-part of co-pending patent application Ser. No. 539,752 filed Oct. 6, 1983, now abandoned.

BACKGROUND OF THE INVENTION

The invention relates to an air cushion vehicle comprising a main engine driving a fan device and a traction wheel device, whereby an air cushion for the support of the vehicle is produced by said fan device and propulsion of the vehicle is obtained by said traction wheel device.

The propulsion of an air cushion vehicle usually gives rise to problems. Normally, the propulsion device is an air propeller. However, the efficiency of an air propeller is poor, and, moreover, the propeller is subject to a rather strong erosion wear. If the air cushion vehicle moves on sandy ground, the propeller may be worn out in as little as 200 hours. The propulsion of an air cushion vehicle by towing or by means of traction wheel units is also known. However, the known traction wheel increase quite considerably the weight of the air cushion vehicle and, besides that, considerable problems are caused by the power transmission to the traction wheel units. Since an air cushion vehicle needs power both for the generation of the air cushion and for propulsion, it is most important that a suitable power distribution between these two devices is obtained. The power distribution should operate so that, when more power is needed for the air cushion, this is obtained simply by reducing the power transmitted to the traction wheel units and vice versa.

SUMMARY OF THE INVENTION

A preferred air cushion vehicle embodying the invention comprises a main engine, a fan device with at least one through flow duct for pressurizing air in an air cushion for supporting the vehicle, and a traction wheel device for propulsion of the vehicle. The main engine is connected to drive the fan device and is also connected through a hydraulic drive system to drive the traction wheel device, whereby power is simultaneously transmitted from the main engine to both the fan device and the traction wheel device. The power consumption characteristics of at least one of the fan device and the traction wheel device can be altered whereby the ratio of power distribution from the main engine to the fan device and the traction wheel device is regulated to meet changes in drive and lift demands due to changes in the terrain over which the vehicle moves.

BRIEF DESCRIPTION OF THE DRAWING

The invention is described in the following with reference to the attached drawing, the single FIGURE of which schematically shows the power distribution arrangement of an air cushion vehicle according to the invention.

DETAILED DESCRIPTION

In the drawing, numeral 1 refers to an engine, for instance a diesel engine, being the main power source of an air cushion vehicle. The engine 1 has a fuel rack 14 whereby the rate of supply of fuel to the engine, and thus the power output of the engine, is controlled. The engine also has a tachometer 15 which monitors the speed of rotation of the drive shaft 2 of the engine and acts upon the fuel rack in such a manner as to keep the speed of rotation constant. The drive shaft 2 is connected to a reduction gear 3, which is connected over a power transmission shaft 4 to a fan device 5 and over another power transmission shaft 6 to a hydraulic pump 7. The transmission ratios between the drive shaft 2 and the power transmission shafts 4 and 6 are each constant. Fan device 5, which may comprise one or several fans, supplies pressurized air through one or several supply ducts 8 to the air cushion (not shown) of the vehicle. The power consumed by fan device 5 is adjusted by flaps 9 on the suction side of the fan device. One of flap $9a$ is shown in its open position. Dotted lines $9b$ indicate the possible existence of additional flaps, which may be opened, but which are closed in the situation shown. The power taken by the fan device from engine 1 is adjusted by opening and closing flaps and thereby altering the total cross-sectional area of the flow ducts through which air is supplied to the cushion. Fan device 5 consumes more power, the more of the flaps 9 that are open. If the fan device comprises several fans, power regulation can also be obtained by disconnecting one or more of the fans from operation.

The hydraulic drive system of the traction wheel device of an air cushion vehicle according to the invention is preferably of conventional design. Known hydraulic drive arrangements comprise one or several hydraulic pumps 7, for instance axial piston pumps, the displacement of which is adjustable. Pump 7 has an electrical displacement regulator that is controlled in dependence upon the position of the fuel rack 14, as detected by a fuel rack position sensor. Pump 7 is connected to a hydraulic circuit 10, through which power is transmitted to a hydraulic motor 11 preferably having a constant displacement. The motor 11 drives one or several traction wheels 12. A caterpillar track improving the traction properties should preferably be associated with the traction wheels. The hydraulic drive arrangement comprises also a hydraulic liquid container 13 and other necessary regulation and safety devices not shown in the drawing, for instance pressure limitation valves, check valves etc. Hydraulic motor 11 may be a radial piston motor, which is quite commonly used as a wheel driving motor.

When the vehicle is running on even ground, relatively little power is required for the air cushion and so several of the flaps 9 are closed. In a practical implementation of the invention, using several fans, one or more of the fans may be disconnected. The low power consumption of the fan device results in the fuel rack position sensor acting on the displacement regulator of the pump 7 to maintain the displacement of the pump at a large value so that the power consumption of the pump is high. The pump delivers fluid to the motor 11 at a high volume rate but at a relatively low pressure, and so the wheel 12 is driven at high speed but with low torque. On passing to difficult terrain, almost the total power generated by the main engine, e.g. more than 80% of the total power, is needed for the air cushion of the vehicle. All air intake flaps 9 of fan device 5 are then opened, whereby the power consumption of fan device 5 automatically goes up to the maximum value determined by the design of the device. The increase in the power consumption characteristic of the fan device 5 causes the fuel rack 14 to tend to supply more fuel in order to maintain the speed of rotation of the shaft 2, and this causes the displacement regulator of the pump to reduce the displacement of the pump so that the pump consumes less power. The pump then delivers fluid to the motor 11 at a low volume rate and at a relatively high pressure, so that the wheels 12 are driven at low speed but with high torque.

It will therefore be seen that the power consumption characteristics of the pump 7 are adjusted automatically when the power consumption characteristic of the fan device 5 is changed, without there being any need for power regulating arrangements in the reduction gear for adjusting the power distribution between the fan device and the pump. As the power available to pump 7 decreases, the displacement of the pump is automatically decreased whereby the rotation speed of traction wheels 12 is reduced and the torque with which the wheels are driven is increased. This is very favorable in a device embodying the invention, since a high torque, that is, a high traction force, is needed precisely when the traction wheels rotate slowly, i.e. in difficult terrain. Despite the high traction force, the power consumed by the driving wheels 12 remains small, which is favorable in view of the described arrangement.

It will also be seen that in the described arrangement the appropriate relationship between the power transmitted to the air cushion and the power transmitted to the wheels is maintained automatically, without its being necessary to use separate drive engines for the fan device and the wheels. Accordingly, manufacturing costs are reduced, as is the weight of the vehicle.

The invention is not limited to the embodiment described, but several modifications thereof are feasible within the scope of the attached claims. For example, the invention may be implemented without use of a reduction gear if the speed of rotation of the engine is appropriate. Hydraulic pump 7 can be directly connected to an extension of drive shaft 2 on the other side of engine 1 or of fan device 5. In the described embodiment of the invention, the power output of the engine remains constant in different operating conditions, but the power output of the engine may be changed by altering its speed, without affecting the manner in which the power distribution between the fan device and the pump (and hence the wheels) is changed when the power consumption of the fan is changed.

We claim:

1. An air cushion vehicle comprising a main engine, a fan device with at least one through flow duct for pressurizing air in an air cushion for supporting said vehicle, a traction wheel device for propulsion of said vehicle, a hydraulic drive system for driving the traction wheel device, power transmission means connecting said main engine to drive said fan device and said hydraulic drive system at respective constant transmission ratios, whereby power is simultaneously transmitted from the main engine to both said fan device and said traction wheel device, and the vehicle further comprising power output control means for adjusting the power output of the main engine in a manner such as to maintain the operating speed of the main engine constant, first power consumption control means for altering the power consumption characteristics of one of said fan device and said hydraulic drive system independently of the power output control means, and second power consumption control means for altering the power consumption characteristics of the other of said fan device and said hydraulic drive system in response to the power output control means, whereby the ratio of power distribution from said main engine to said fan device and said hydraulic drive system is regulated to meet changes in drive and lift demands due to changes in the terrain over which the vehicle moves.

2. An air cushion vehicle according to claim 1, wherein said hydraulic drive system comprises a hydraulic pump connected to be driven by the main engine at a constant transmission ratio, a hydraulic motor connected to the hydraulic pump and connected to drive the traction wheel device, and duct means connecting the motor and the pump in a hydraulic circuit.

3. Air cushion vehicle according to claim 2, wherein the hydraulic motor is a constant displacement hydraulic motor and the hydraulic drive system includes means for changing the rate of flow of hydraulic fluid from the pump to the motor in response to the power output control means, thereby influencing the operating speed of the traction wheel device.

4. Air cushion vehicle according to claim 3, wherein the hydraulic pump is an adjustable displacement pump.

5. Air cushion vehicle according to claim 1, wherein the first power consumption control means alter the power consumption characteristic of said fan device and comprise means for changing the total cross-sectional area of said one through flow duct.

6. Air cushion vehicle according to claim 5, wherein the means for changing the cross-sectional area of said one through flow duct include at least one closure flap for influencing the air intake area of the fan device.

7. An air cushion vehicle comprising a main engine, fuel supply control means for controlling the rate of supply of fuel to the main engine, tachometer means for detecting the speed of operation of the engine, said tachometer means being connected to the fuel supply control means for controlling the rate supply of fuel to the main engine so as to maintain constant the speed of operation of the engine, a fan device with at least one through flow duct for pressurizing air in an air cushion for supporting said vehicle, a traction wheel device for propulsion of said vehicle, a hydraulic drive system for driving the traction wheel device, power transmission means connecting said main engine to drive said fan device and said hydraulic drive system at respective constant transmission ratios, whereby power is simultaneously transmitted from the main engine to both said fan device and said traction wheel device, and the vehicle further comprising two power consumption adjustment devices for altering the power consumption characteristics of said fan device and said hydraulic drive system respectively, the power consumption adjustment device of one of said fan device and said hydraulic drive system being connected to said fuel supply control means so that when the power consumption characteristic of the other of said fan device and said hydraulic drive system is altered the ratio of power distribution from the main engine to said fan device and said hydraulic drive system is regulated.

8. An air cushion vehicle comprising a main engine, fuel supply control means for controlling the rate of supply of fuel to the main engine, tachometer means for detecting the speed of operation of the engine, said tachometer means being connected to the power control means for controlling the rate of supply of fuel to the main engine so as to maintain constant the speed of operation of the engine, a fan device with at least one through flow duct for pressurizing air in an air cushion for supporting said vehicle, means for altering the power consumption characteristic of the fan device, a traction wheel device for propulsion of said vehicle, a hydraulic drive system for driving the traction wheel device, power transmission means connecting said main engine to drive said fan device and said hydraulic drive system at respective constant transmission ratios, whereby power is simultaneously transmitted from the main engine to both said fan device and said traction wheel device, said hydraulic drive system comprising:

a pump which is connected to be driven by the main engine through the power transmission means, means for adjusting the displacement of the pump when the rate of supply of fuel to the main engine is adjusted, a constant displacement hydraulic motor which is connected to drive the traction wheel device, and duct means connecting the motor and the pump in a hydraulic circuit.

* * * * *